March 7, 1950 J. W. FRITSCH 2,499,579

TURRET-TOP TELEVISION CABINET

Filed April 30, 1945 5 Sheets-Sheet 1

Inventor

JOHN W. FRITSCH

By H. S. Grove.

Attorney

INVENTOR.
JOHN W. FRITSCH
BY H. S. Grover.
ATTORNEY

INVENTOR.
JOHN W. FRITSCH
BY H. S. Grover
ATTORNEY

March 7, 1950 J. W. FRITSCH 2,499,579

TURRET-TOP TELEVISION CABINET

Filed April 30, 1945 5 Sheets-Sheet 4

INVENTOR.
JOHN W. FRITSCH.
BY H. S. Grover.
ATTORNEY

March 7, 1950 J. W. FRITSCH 2,499,579

TURRET-TOP TELEVISION CABINET

Filed April 30, 1945 5 Sheets-Sheet 5

INVENTOR.
JOHN W. FRITSCH
BY
H. S. Grover.
ATTORNEY

Patented Mar. 7, 1950 2,499,579

UNITED STATES PATENT OFFICE 2,499,579

TURRET-TOP TELEVISION CABINET

John William Fritsch, Allentown, Pa., assignor to Radio Corporation of America, New York, N. Y., a corporation of Delaware Application April 30, 1945, Serial No. 591,050

3 Claims. (Cl. 178—7.5)

The present invention relates to television devices and is directed, in particular, to improvements in television cabinets and image viewing and/or projection systems whereby television and like images may be conveniently viewed from different positions with respect to a television cabinet.

Television apparatus for exhibiting a television image is normally housed in a cabinet which serves as a piece of furniture and therefore is a part of the decorative scheme in its surroundings. For example, it is placed in a given position in a living room or in a public place of amusement. The image forming and exhibiting portion of the apparatus, if it is fixed with respect to the cabinet or housing thereof is many times in an inconvenient position unless the cabinet or housing is moved from the selected position it occupies in its immediate surroundings. For example, the viewing arrangement of an ordinary television receiver is normally visible only to those seated immediately before the receiver and is usually not conveniently visible to a person seated in an easy chair, which is normally located without reference to the position of the television receiver in the room. A person, such as a hospital patient in a reclining position could not, comfortably, see the image in an ordinary television receiver. Also, the viewing apparatus would not be conveniently visible to a person standing before the receiver unless the receiver were higher than normal household furniture height.

The principal aim of this invention is to provide television apparatus in which the viewing arrangement is accessible to persons seated as they normally would be in a room, to persons in a reclining position, or to persons standing before the apparatus. In the latter case, television apparatus improved in accordance with the invention is especially applicable for use in public places where the television apparatus or mechanism may be placed in operation for public observation. Units of this type may readily be controlled, when desired, upon depositing a coin, and it accordingly should be understood that this invention relates to coin controlled units, as well as the type more frequently used at present.

Accordingly, it becomes an object of the present invention to provide a more convenient arrangement for viewing television images while maintaining the normal or selected location of the cabinet in which the apparatus is housed.

Another and closely related object of the invention is to provide a convenient arrangement for viewing enlargements of television images from different positions with respect to the location of the cabinet or housing for the television apparatus.

Still another object of the invention is to provide for substantially universal movement of the viewing apparatus of a television receiver to different positions to afford easy visibility of the images when viewed above or below the usual substantially horizontal viewing plane.

A still further object of the invention is to provide novel means for adjusting the position and hence the viewing angle of television image viewing devices.

A still further object is to provide a housing or cabinet for a television receiver having novel arrangements for supporting an image producing device.

Other objects of the invention are those of providing a viewing cabinet structure which overcomes one or more defects already found to exist in prior art arrangements, as well as to provide a cabinet structure for viewing television images and the like which is of attractive appearance, reasonable in cost of construction, efficient in operation, and easy for the user to operate.

Still other objects of the invention as well as many advantages thereof will become apparent when the following specification and claims are read in connection with the accompanying drawings wherein:

Figure 1:
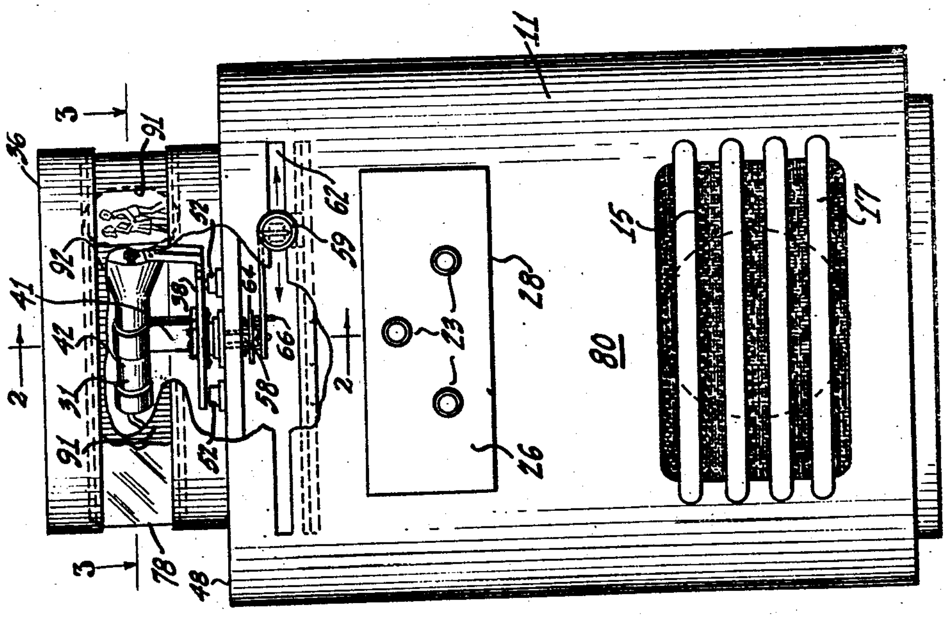
Fig. 1 is a view in front elevation of a television cabinet embodying the invention in one of its modifications, certain of the parts being broken away for the sake of clearness of illustration.

In the form shown in Figs. 1 to 5, the invention is shown, illustratively, in connection with a cabinet base structure of substantially rectangular parallelopiped form, in one section of which there is located the usual signal receiving equipment, the power supply therefor, and the sound reproducing equipment. A television image producing and exhibiting arrangement, to which the invention is more particularly directed, supplements the cabinet either as a unitary or integral part thereof, or as an added cabinet section or compartment. It will be understood that in view of the detailed description which is to follow, the shape and appearance of the cabinet as well as the image producing and exhibiting apparatus may take many forms within the scope of the present invention in the aspect thereof which is presented in Figs. 1 to 5 of the drawings.

Referring now more particularly to Figs. 1 to 5 of the drawings for a further understanding of the invention in one of its modifications, the cabinet base structure 11 is arranged to house suitable electronic apparatus (not shown) for converting electrical or radio signals to video or image signals which serve to control or modulate an image producing device such, for example, as a cathode ray tube. The housed apparatus is used, also, for converting accompanying or even separate signals or unrelated audio signal modulations into sound signals which are to be effective to actuate a suitable sound reproducing element such as a loudspeaker unit conventionally represented at 14 and positioned internally of a grille or the like 17, protected externally by means of the grille members 19. While the electronic apparatus just referred to has not been shown, for convenience of illustration, it may be assumed, essentially, that it is contained in the cabinet structure and a part of it, at least, supported on the ledge structure 21. Suitable external tuning, volume, and other operational controls are provided by the conventionally represented knob or knobs 23, accommodated in a panel portion 26 associated with the ledge 21.

When desired, the support ledge 21 may be used to mount at least the head end of the receiver instrumentality. For convenience of operation and as an aid in tuning and adjustment, this portion of the receiver structure may be pivoted on a hinge unit located at 28 so as to swing bodily outwardly from the cabinet 11. In this way, if the various components, such as the receiver tubes supported on the ledge 21, are in a vertical position with the ledge structure 21 in the position of Fig. 2, a pivoting of the panel 26 about the hinge at 28 will bring the tubes or other elements externally of the cabinet to a position varying, for instance, between 45° to the vertical and a horizontal position depending upon the position of a suitable stop member (not shown) which will serve to limit the motion. The power supply system, likewise, is not shown but is preferably mounted in the lower portion of the cabinet structure.

When signal energy, as received, is converted into demodulated video or image control signal impulses, these signals are applied to control or modulate a cathode ray image producing tube, conventionally represented at 31, to produce, in known manner, on the fluorescent or luminescent viewing screen or target area 33 thereof a suitable electro-optical television image. The operation of a tube of this character is so well known that it will require no further description other than to state that the received signals serve to modulate a cathode ray beam developed within the tube 31 so that the controlled intensity cathode ray beam, when impacting the fluorescent screen or target area 33 and when swept thereacross in a bi-dimensional path to form the well known image raster, causes the electro-optical television image to be produced. Image signals and/or polarizing voltages for the tube 31 may be supplied over a cable connection indicated at 32 in Fig. 1.

The optical image projection and enlarging system shown herein in connection with a modified form of the invention is equally adapted for black and white monochrome image representations and for image representations in natural color, but for convenience of illustration, the arrangement has been illustrated as applicable to monochrome.

In accordance with the invention as it is embodied in Figs. 1 to 5 of the drawings, the image producing tube 31 is carried in a turret-like structure, designated generally by reference character 36, in a manner to permit the image appearing on the screen or target 33 to be viewed easily by an observer at the front or at either side of the receiver. To this end the tube 31 is mounted upon a platform-like support 38 by suitable means, such as a bracket 41 which may partially encircle and may be clamped to the neck 42 of the tube 31. A bracket 44 (Fig. 3) may extend upwardly from the platform 38 to receive the bulb portion of the tube 31 adjacent its end. The platform 38 is rotatably carried, for example, by the top 48 of the cabinet as indicated in Fig. 1 of the drawings, upon rotatable bearing elements 52 which may be roller or ball bearings, as shown. The bearing elements 52 may conveniently be seated upon and secured to the top 48 of the cabinet 11. An operating rod or shaft 58 extends into the interior of the cabinet so that the radial position of the tube 31 may be changed by any suitable means associated with the cabinet 11. These means may be mechanically operated, as in the illustrative example, by means of a sliding knob 59 accommodated in a slot 62 through mechanism which is shown illustratively on Figs. 1 and 2 of the drawings. It will be understood, also, that the position of the tube may be altered by remote controlled means, such as a motor and suitable reversing switch controls for the motor. The reversing switch controls may be push buttons or the like located in or on any of the panel portions of the cabinet 11 so as to be conveniently accessible. As reversing switches, including push button control, are by now well known in the art, further illustration is deemed unnecessary.

Figures 4, 5, 11:
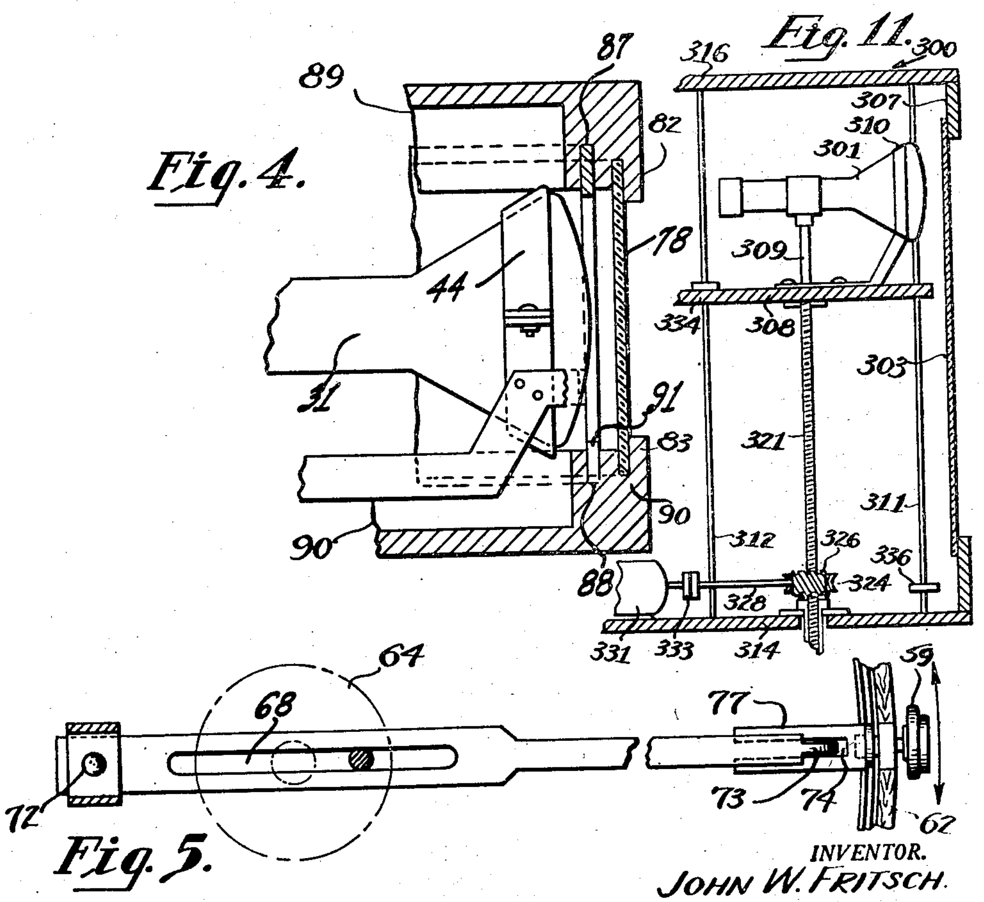
Fig. 4 is a fragmentary section, the section being taken on line 4—4 of Fig. 3.
Fig. 5 is a fragmentary sectional view taken on line 5—5 of Fig. 2, the parts being indicated from beneath as shown by the arrows.
Fig. 11 is a fragmentary section of still another modification of the invention.

In the illustrative arrangement for moving the tube 31, the shaft 58 has secured upon its end a disc 64 from which a pin 66 projects through a slot 68 in a swingable arm 69, these parts being shown from beneath in Fig. 5 of the drawings. The arm 69 is pivoted at 72 within the cabinet 11, and its free end 73 extends downwardly into a slot 74 in a member 77 carried by the knob 59. As the knob 59 is moved from one end to the other end of the slot 62, the tube 31 will be swung through an angle of approximately 180°. The slot 74 accommodates the end 73 of the arm where the front panel 80 of the cabinet is substantially flat. The arrangement shown which, as stated above, serves for purposes of illustration, is suitable inasmuch as it provides a convenient and ready means for changing the position of the tube 31 within the turret 36.

A motor drive may be arranged to connect to the shaft 58 so that the swingable support 38 may be moved by the motor. It will be understood that stops for limiting the amount of travel in either direction of the member 38 may be provided and that a slip clutch drive may be supported between the motor and its operative connection to the shaft 58. An example of a drive of this nature is described in a copending application for Letters Patent of the United States for "Viewing devices" filed in the name of Ray Victor Beshgetoor on October 18, 1944, and bearing Serial No. 559,201, now Patent No. 2,404,943, granted July 30, 1946.

The means associated with the turret 36 which facilitates viewing of the image formed by the housed and protected tube 31 may comprise a sheet of transparent material 78 which conforms in curvature to the outline in plan of the turret. For this purpose, a transparent plastic material, curvable to the desired form, will be ideally suitable.

The top and bottom members of the turret may be provided with lips 82 and 83 to provide bordering or masking elements for the target end 33 of the tube. The interior of the turret is concealed, and an additional masking means for the image end of the tube is provided by a flexible screen or curtain member 86 which fits within grooves 87 and 88 formed in the top and bottom turret members 89 and 90, respectively. A pair of vertically disposed rollers 84 and 85 (Fig. 3) at the rear of the turret 36 serve to guide the curtain 86 as it enters the slots 87 and 88 and cause it to move laterally of the cabinet at the back of the turret. The curtain may be of cloth reinforced at intervals with transverse rods or, conversely, it may be of the same type as used in flexible covers of roll top desks or the like. The ends 91 and 92 of the curtain 86, one of which, 91, appears in Fig. 4 of the drawing, are provided with extensions 95 which are connected to the member 38 which supports the tube 31 through the bracket 44 and arms 96 and 97.

By the arrangement described, it will be seen that when the knob 59 is moved within the slot 62 so as to bring the screen end of the tube 31 into a desired angular position for conveniently viewing the television image, the curtain 86 will move with the tube not only to outline the image which is to be viewed, but also to conceal the interior of the turret 36.

Figures 6, 7:
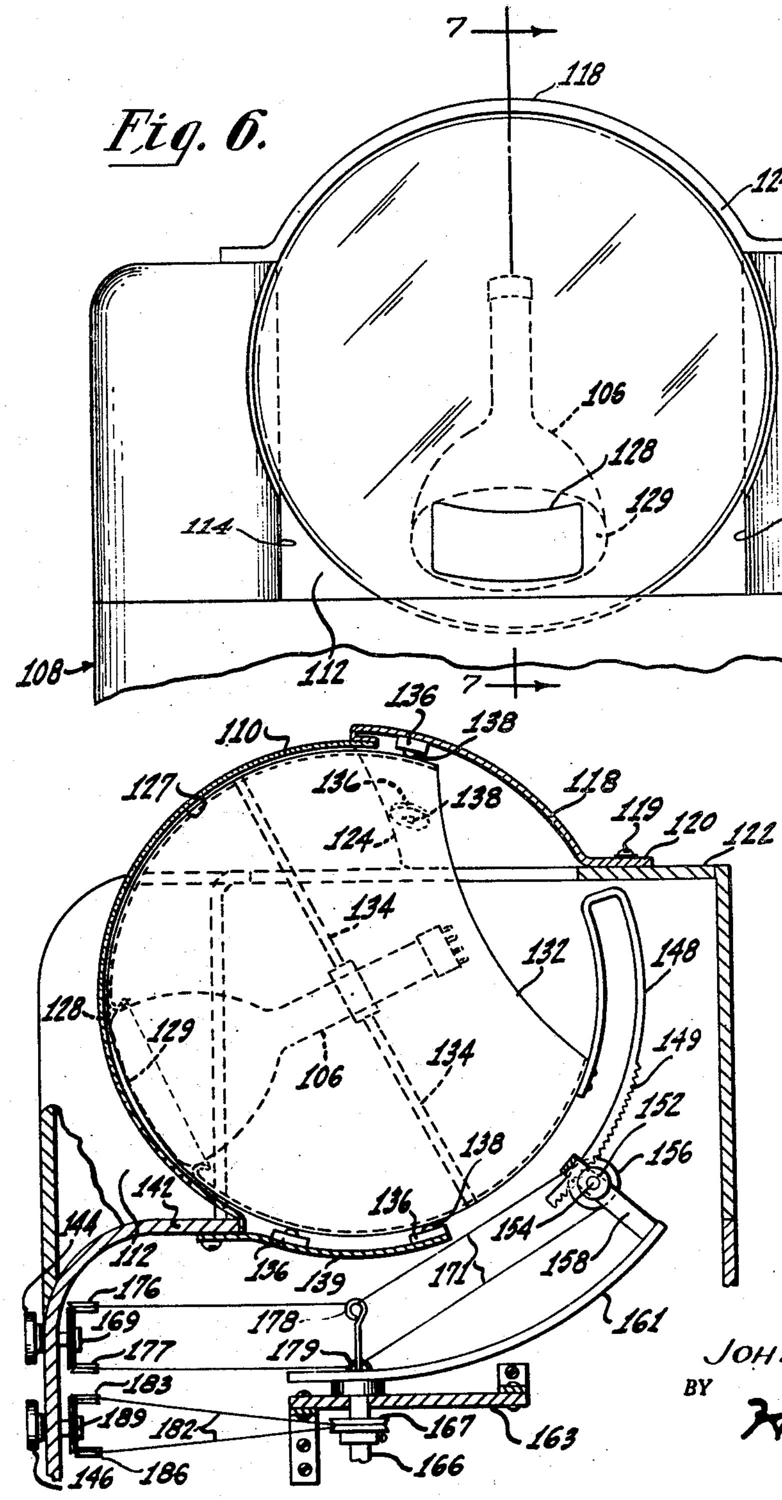
Fig. 6 is a view in front elevation of the upper portion of a television cabinet embodying the invention in modified form.
Fig. 7 is a view in sectional elevation, the section being taken on line 7—7 of Fig. 6.

Figs. 6 and 7 of the drawings show a modification in which an image producing tube, such as the tube 106, may be moved vertically as well as horizontally. In accordance with this modification of the invention, a cabinet, fragmentarily shown and indicated by reference character 108, may contain the power supply, receiving equipment and sound reproducing equipment described in connection with Figs. 1 and 2 of the drawings, and image signals from this receiving equipment may be furnished in any suitable and known manner to the tube 106. The tube 106 is or may be similar in all respects to the tube 31 of Figs. 1 to 5 of the drawings. The cabinet 108 carries a transparent member 110 of spherical form which is mounted partially within a recess 112 provided, for example, by inwardly curving the panels at the top of the cabinet as indicated at 114 and 116. The exposed face of the transparent member 110 is substantially hemispherical and is backed by curved bracket member 118 provided with a flange 120 which is secured as by screws 119 to the top 122 of the cabinet. The forward edges 124 of the member 118, one of which appears in Fig. 7 of the drawings, is or may be curved somewhat as shown to set a limit to the viewing zone afforded by the transparent spherical member 110.

An opaque spherical member 127, having a radius slightly smaller than the radius of the member 110, is nested within the member 110. An aperture 128, coextensive in size with the area of the image to be presented by the target end 129 of the tube, is provided in the opaque spherical member 127, and for convenience of assembly, this opening 128 preferably is located centrally of the opening 132 in the opaque spherical member which gives access to the interior thereof for the purpose of mounting and adjusting the tube 106, the latter being held by any suitable means such as are indicated at 134.

From the parts thus far described, it will be seen that the aperture 128 may be moved within the nested transparent spherical member 110 so that the image presented in the opening 128 may be viewed from points above or below the horizontal axis of the spherical member 110 or from either side of the cabinet. It will be understood that the range of movement of the spherical member may be anything desired, however, for most television applications, the range of movement provided by illustrative embodiment which is greater than 180° horizontally and is approximately 90° vertically will be sufficient.

The opaque spherical member 127 is preferably supported out of contact with the transparent spherical member 110, and this may be done, for example, by employing ball supporting members 136 each one of which is provided with a freely rotatable ball bearing 138. Certain of these members may be mounted on the bracket 118 and also upon brackets 139 projecting from the inwardly turned horizontal shelf 142 of the cabinet 108. In a preferred arrangement, a number of the ball supporting members 136 carried by the brackets 139 will be so located that they extend inwardly of the cabinet 108 from the front thereof to points beyond diameters of the member 110 passing through the members seated on the bracket 118. With this arrangement the member 127 may be snapped into place by making the longer brackets 139 of spring material.

It is within the scope of the invention to rotate the opaque spherical member 127 within the transparent member 110 by remote controlled power driven means if desired. Manually operable means are shown by way of example for moving this spherical member comprising operating knobs 144 and 146, accessible from the front of the cabinet. One degree of movement is imparted by the knob 144 through a mechanism including a curved rack member 148 provided with teeth 149 meshed with a pinion 152. The pinion 152 is secured to a shaft 154 together with a pulley 156. The shaft 154 carrying the pinion 152 and the pulley 156 is rotatably mounted in a bracket 158 carried by a swingable member 161. The bracket 158 may be bifurcated and extend beyond the pinion on either side of the rack 148 so as to constrain the rack to move with the swingable member 161. A fixed shelf or support 163 provides for mounting the swingable member 161 by rotatably receiving a stub shaft 166 which carries a pulley 167.

The operative mechanical connection between the pulley 156 and a pulley 169, whereby the latter is rotatable with the knob 144, is provided by a string belt 171 or its equivalent which is guided by pulleys 176 and 177, the latter being shown as lying in planes substantially at right angles to the plane of the pulley 169. The pulley 169 rotates upon rotation of the knob 144 and turns with a turning of knob 144. Guides 178 and 179, which may be in the form of loops, for example of metallic wire as shown, are preferably positioned closely adjacent the center line of the stub shaft 166 so as to provide for proper operation of the pulley 156 by the belt 171 even though the swingable member 161 is moved to different angular positions. A projection of the center line of the stub shaft 166, with proper alignment of the system, will be understood to intersect the center of rotation of the member 127 which is turned by the rack 149.

Interconnection between the knob 146 and the previously mentioned pulley 167 is provided by a belt 182 passing over idler pulleys 183 and 186 to a pulley 189 rotatable with the knob 146. The previously mentioned remote controlled power driven means, if employed, may, for example, comprise a motor connected to the shaft 154 through a suitable slip clutch unit as stated in connection with the description of Figs. 1 to 5 of the drawings. Also, a motor may be connected to the shaft 163 through a suitable slip clutch unit in a like manner. Both of these motors may be controlled by push buttons or the like or reversing switches of other known types.

From the foregoing description of the invention, as embodied in Figs. 6 and 7, it will be seen that the transparent spherical member 119 serves as a housing, which may be sealed to cabinet portions with which it is in contact, so as to exclude dust from the electrical equipment which is housed within the cabinet and to prevent access into the interior of the receiver except upon following a proper or prearranged dismantling procedure. Also, the opaque spherical member 127 which is nested within the transparent member, excludes light from the interior of the portion of the receiver in which the image producing tube is positioned so that a shadow box effect is provided which aids in viewing the pictures. The style and appearance of the cabinet which is associated with the form of the invention disclosed by Figs. 6 and 7 of the drawings, lends itself to use in public and semi-public places, such as clubs, amusement halls, and the like. For such locations the television apparatus may be placed in operation by a check or coin release mechanism, as above suggested.

Figure 8:
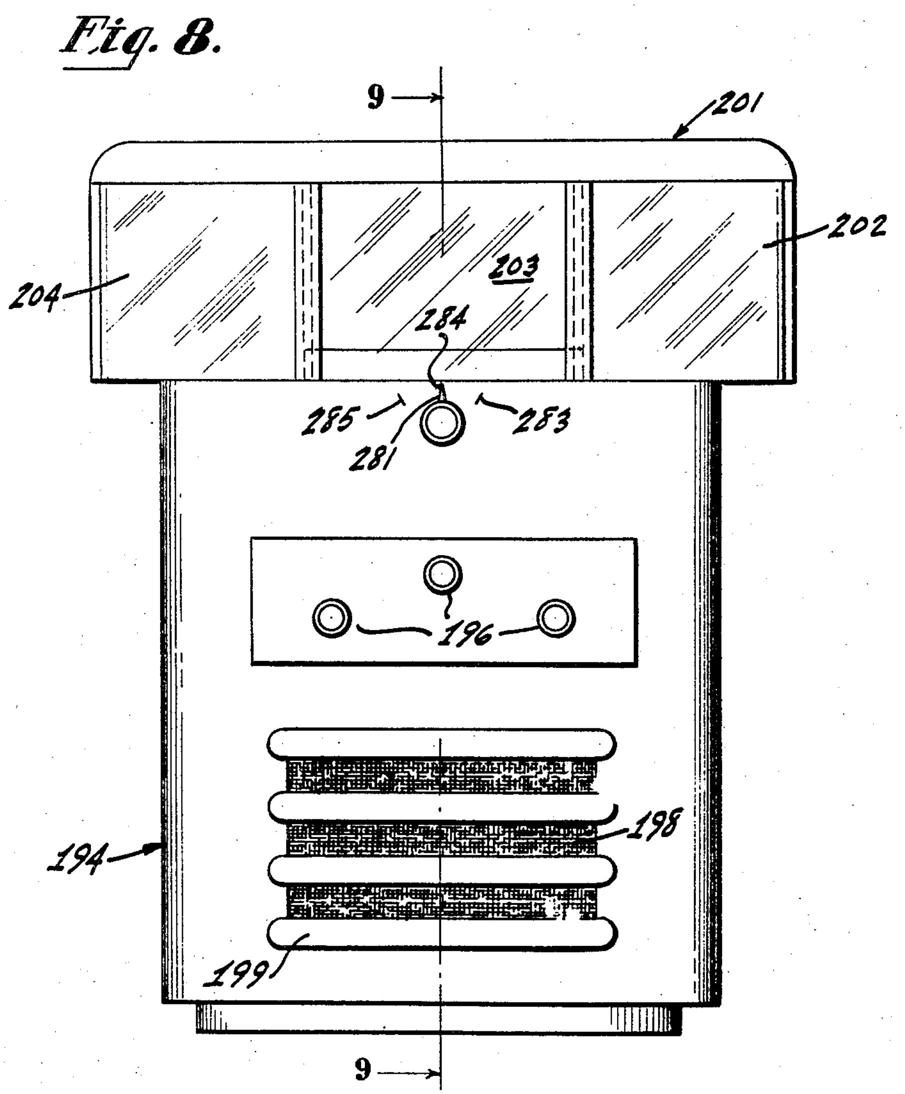
Fig. 8 is a view in front elevation of a television cabinet equipped with a projection system modified in accordance with the present invention.
Figure 10:
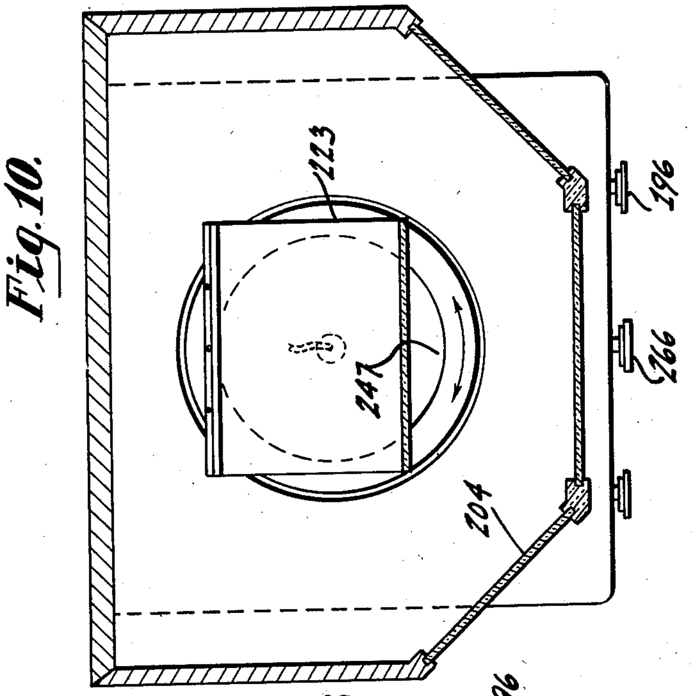
Fig. 10 is a sectional view in plan of the cabinet of Fig. 9, the section being taken approximately on line 10—10 of Fig. 9.
Figure 9:
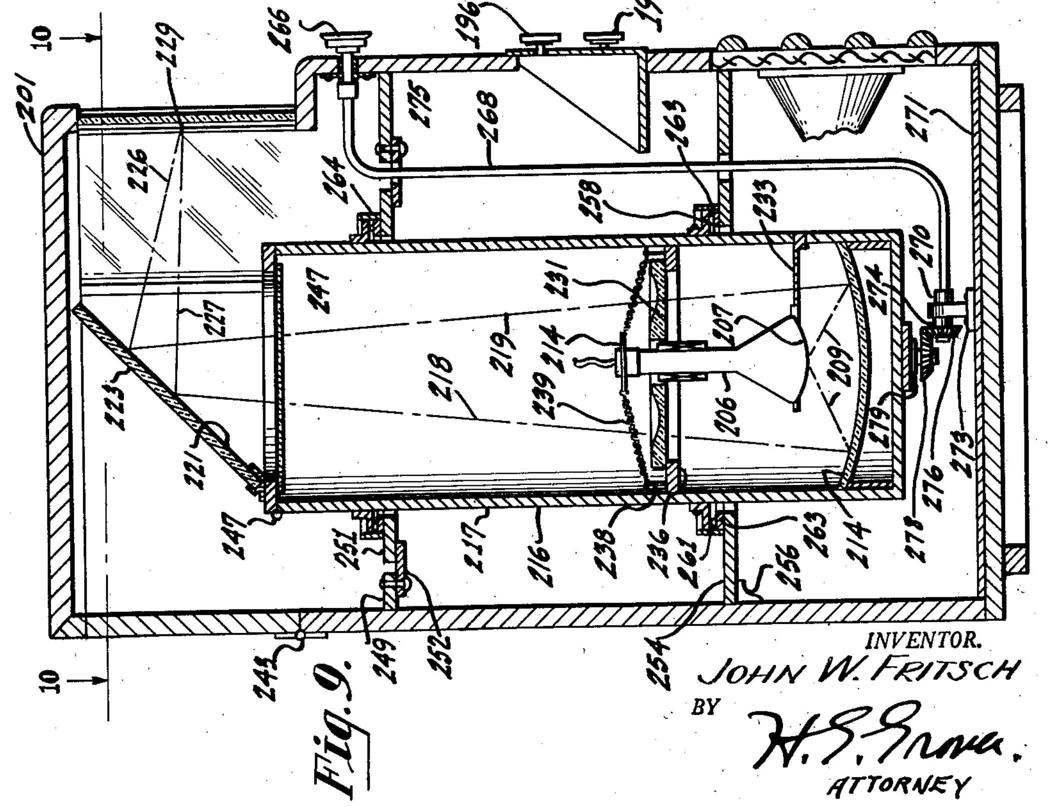
Fig. 9 is a sectional view taken on line 9—9 of Fig. 8.

Figs. 8, 9, and 10 disclose the invention in connection with an image projection system in which the image to be viewed is projected upon a screen. While this embodiment of the invention is disclosed in connection with a reflective optical system, it will be understood that the principles to be outlined herein are equally applicable to systems employing refractive projection, for example by a suitable lens system.

Referring now to Figs. 8, 9, and 10, a cabinet 194 comprises accommodations for electronic apparatus (not shown) such as was mentioned in connection with Fig. 1 of the drawing. Controls suitable for operating this apparatus will be provided and are indicated at 196. A grille 198 for concealing the associated sound producing apparatus is provided, for example, in the front of the cabinet as shown, protected by grille members 199. The apparatus to be housed in the cabinet is or may be more or less conventional and need not be further described here. The upper part of the cabinet is devoted to a portion of the projection image viewing means constructed and arranged in accordance with this invention and is seen to comprise a housing or structure 201 for positioning viewing screens 202, 203, and 204. These screens are of any suitable and desired character. Each screen is usually formed of translucent glass or plastic or it may be formed in any other manner provided that it serves to exhibit optical images to a viewing audience. The manner of providing an image selectively to any one of a plurality of screens is an important feature of this invention, and it will be understood in this connection that while three screens have been shown illustratively, any number may be provided. Also, in this connection, it may be noted that opaque screens spaced radially from the cabinet 194 may be employed for the benefit of an observer or observers facing the screen which is selected for use. For example, the projecting means of the invention in the form now being described or modified, as noted above, to project an image on external screens, may be arranged to afford viewing facilities around the full 360° in the vicinity of the receiver. An image producing tube 206 (Fig. 9), which, as noted in connection with Fig. 1, has a television image produced on the luminescent target area 207, projects the television image along an optical path, conventionally represented at 209, toward a spherical reflecting element 214 which is suitably held and supported in a projecting unit or "capsule" indicated in its entirety by reference character 216. The principal supporting member of this unit is a cylindrical member 127 which may be made of metal, plastic, or any other suitable material. The image which has been projected upon the reflecting surface of the element 214 is then reflected therefrom along the optical paths conventionally represented at 218 and 219 toward the mirror surface 221, presented by a plane mirror 223. The impinging light rays then are in turn reflected along the indicated optical paths 226 and 227, respectively, to focus, for example, in the plane of any one of the viewing screens 202 to 204, depending upon the angular position of the cylinder 217. The point of focus of the rays 226 and 227 is indicated conventionally at 229. At an intermediate point in the optical path, an aspheric zone plate 231 (also termed "correcting plate") is positioned to receive the light reflected from the reflecting surface of the member 214. The aspheric zone plate 231 is arranged externally to the light path from the tube to the reflector and axially aligned with each. This zone plate is arranged to correct for any spherical aberrations introduced into any of the light rays by the curved reflecting surface of the member 214 so that a sharply focused reproduction of the image developed on the fluorescent or luminescent target area 207 of the tube 206 is produced on the viewing screen which is in use. It will be understood that the image on the screen may be enlarged or diminished as desired depending upon the selected design of the optical system.

An arrangement for positioning and locating the aspheric zone plate relative to the cathode ray image producing tube, such as 206, and its associated spherical reflecting member 214 is shown and described by U. S. Patent No. 2,273,801, granted February 17, 1942, to D. O. Landis, and, therefore, will not be described herein in any considerable detail in that reference may be made to the aforesaid patent for details as to the construction and arrangement of the plate and the broad features of its use as a part of the optical system. For the purpose of these considerations, the aspheric zone plate 231 may be assumed to have a central opening for the purpose of passing the tube neck, the mounting of which for purposes of this invention may be accomplished in any suitable or desired manner. For example, the tube may be positioned within the unit 216 by a radial arm or arms 233 projecting inwardly from the sides of the cylinder 217 and engaging the tube thereon adjacent the edge of its target end. The zone plate 231 is supported on an annular shelf 235 which is provided with securing means such as the members 238 to which are secured helical springs 239. The remaining ends of the springs 239 are engaged with a ring member 241 which supports and centers the end of the tube neck. An example of a suitable tube supporting arrangement is described in a copending application for Letters Patent of the United States for "Art of mounting cathode ray tubes," filed in the name of Ioury G. Maloff on November 30, 1943, bearing Serial No. 512,307, now abandoned.

The previously mentioned plane mirror 223 is mounted upon the cylinder 217 by any suitable means, for example by a bracket member or members, and makes an angle of 45° with respect to any one of the screens 202 to 204 and the axis of the member 217.

In order to facilitate assembly of the apparatus described herein, the previously described housing or structure 201 may be constructed as a separate self-supporting unit which is hinged to the cabinet proper 194 by a hinge unit 243 which may be of the pin type employed in piano construction so that the alignment between the housing 201 and the cabinet proper 194 may be rigidly mounted. The entire housing 201 may then be raised to a substantially vertical position so as to afford access to the unit 217. The ring member 245 surmounting the unit 216 and carrying the plane mirror 233 may be hinged at 247 to permit access to the interior of the cylindrical member 217 for the purpose of replacing or adjusting the tube 206. To prevent access of dust to the interior of the cylinder, the ring member 245 may contain a transparent cover 247 of glass or the like, treated, if desired, to minimize light reflection losses. A shelf 249 is mounted within the cabinet proper 194 and serves as a guide or rest in a manner to be described for the projection unit 216, and to facilitate removal of the projection unit, this shelf 249 is provided with a removable inner section 251 which rests on a flange 252 secured to the under side of the shelf 249. A procedure for removing and replacing the optical unit 216 will be described hereinafter following the description of the supporting means by which the optical unit 216 is revoluble within the apparatus.

The entire projection unit 216 is mounted in accordance with the invention so that it may be rotated freely about an axis which coincides with the image projection axis of the projection system comprising the tube, the spherical mirror, and the correcting plate. Mounting means which provides for this rotation may comprise a supporting shelf 254 secured in any suitable manner, as by brackets 256, to the bracing, a panel or panels of the cabinet 194. A bearing ring 258 is secured to the cylinder 217 and is supported by anti-friction bearing members, such as roller or ball bearings 261 which roll on a bearing ring 263 secured to or resting upon the shelf 254. Auxiliary guiding means, serving also as a seal for the lower portion of the cabinet, are provided by a ring 264 secured to the previously mentioned shelf 249. The cylindrical bore of the ring 264 may be lined with felt or the like so as to adequately perform its sealing function. This is possible, the guiding function being secondary since the principal weight of the projecting unit 216 is borne by the bearings 261 which, being of the combined radial and thrust type, maintain the axis of rotation at all times coincidental with the geometrical axis of the cylinder 217. By this arrangement, the relationship between the projecting unit 216 and the screens 202 to 204, which are rigidly attached to the housing 201 which is in turn secured to the cabinet 194, is maintained within necessary tolerance limits.

There remains to be described means by which the projecting unit 216 may be rotated in a positive manner so that the projected image may be viewed on a desired one of the screens. This may be accomplished, manually, for example, by rotation of a knob 266 conventionally accessible exteriorly of the cabinet 194. As shown, this knob may be mounted upon the front panel of the cabinet adjacent to the knobs 196. A flexible shaft 268 is provided at its end with a suitable shaft coupling member 270 supported from the cabinet floor 271 by bracket 273. At the location 275 where the shaft 268 passes through the shelf 249, a dust seal may be provided, as well as at other locations where dust may enter, to accumulate on high voltage apparatus (not shown) in the cabinet 194. The coupling member 270 may be of any suitable or desired type such, for example, as those which are used to connect burrs in a dental engine with the flexible driving shaft. The driving shaft 274 which projects from a coupling member 270 has secured thereon a bevel pinion 276 which is in mesh with a bevel pinion 278 secured to the cylinder 217 by a stub shaft 279 so that it may drive the cylinder 217 when the knob 266 is turned.

So that an indication will be had of the selected screen, a pointer 281 may be secured to the knob 266 to cooperate with marks 283 to 285 on the cabinet panel. It will be understood that there will be, preferably, one mark for each screen, irrespective of the number of screens. The unitary optical projector 216 may be rotated by remote controlled means such as a motor and suitable reversing switch controls for the motor. These reversing switch means may comprise a push button or push buttons conveniently located in or upon the cabinet 194.

To install or remove the tube 206 or its optical accessories in the projection unit 216 of the arrangement of Figs. 8, 9, and 10, the housing 201 is swung up to a vertical position, or beyond, on the hinge 243, following which the ring member 245 carrying the mirror 223 is swung upwardly on its hinge connection 247. It will be understood that any suitable latch means (not shown) may be provided for the housing 201 and the ring 245, if desirable or necessary. The interior of the cylinder 217 is then accessible for the purpose of adjusting the position of or replacing the tube 206.

The entire unit 216 may be conveniently and readily placed in the cabinet 194 simply by lowering it into the cabinet so that the lower end thereof passes through the opening in the shelf 254 until the bearing ring 258 seats on the bearing means 261. At this time, the bevel pinion 278 will mesh readily and accurately with the pinion 276.

The removable inner section 251 of the shelf 249 will be freely slidable on the cylinder 217 and will come to rest upon its supports 252 as the unit 216 is lowered into the cabinet. To remove the unit 216 from the cabinet, it is only necessary to reverse the procedure just outlined.

The bottom of the cabinet including the panel 271 may be removable from the under part of the cabinet 194 so that installation and/or adjustment of the shaft coupling 270 may be obtained.

Figure 2:
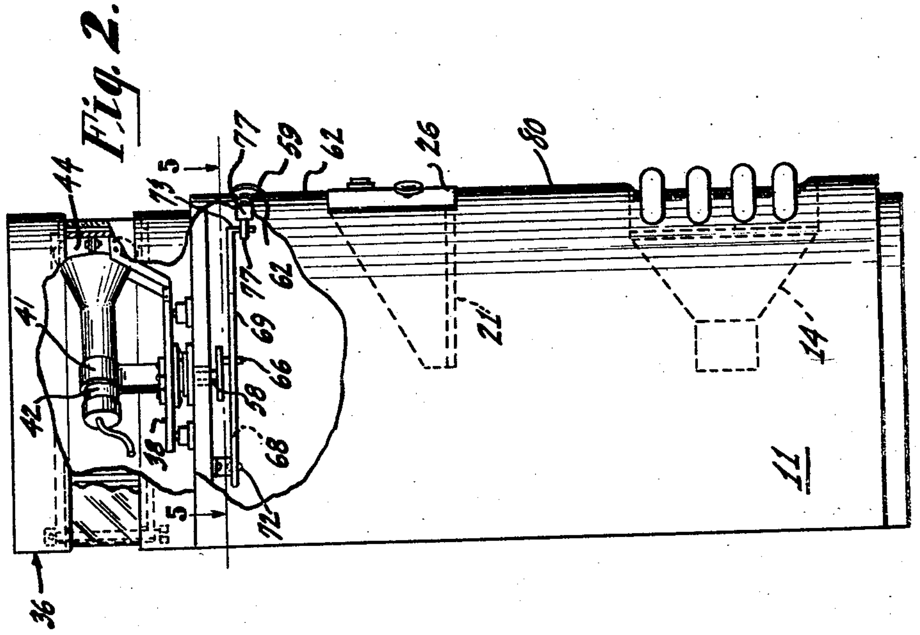
Fig. 2 is a sectional view taken on line 2—2 of Fig. 1 as viewed in the direction of the arrows.
Figure 3:
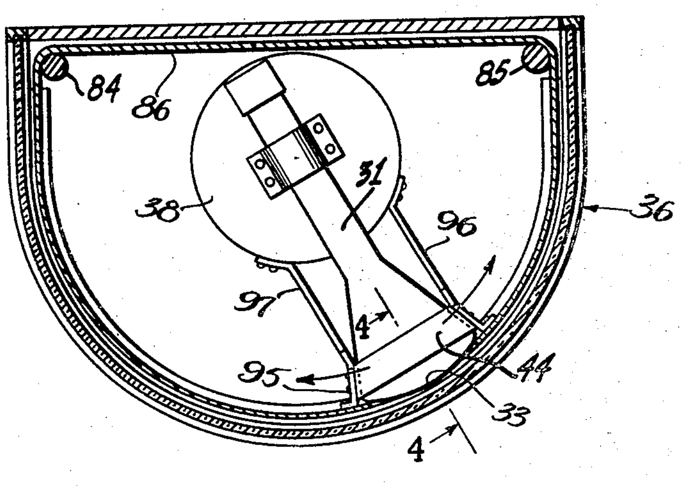
Fig. 3 is a sectional view in plan with the section being taken on line 3—3 of Fig. 1 as viewed in the direction of the arrows.

Referring now to Fig. 11 of the drawings, reference character 300 indicates a cabinet (shown fragmentarily), which may be like that shown in Figs. 1 and 2 of the drawings, for housing the electronic equipment and sound reproducing apparatus usually associated with a television receiver. In accordance with this aspect of the invention, there is provided an arrangement whereby the television image producing means, such as an image producing tube 301, may be moved to different locations vertically in the cabinet 300. The cabinet 300 has provided thereon a transparent window 303 of glass, a plastic material, or the like, behind which the image producing tube 301 is arranged to move vertically so that it may be brought to the most convenient height for viewing by a seated person, a person lying down, or a person in a standing position.

It will be understood that the transparent window 303 will be of a width substantially coextensive with the width of the image presented upon the target area 306 of the image producing tube 301. Therefore, the front panel 307 or the like of the cabinet 300 will be apertured to accommodate a window 303 of the width and height desired. The height of this window will depend upon the distance between the lowermost and the uppermost position of the tube 301 for a given use. Vertical movement of the tube 301 may conveniently be provided by supporting the tube upon a platform 308 by tube receiving means such as brackets 309 and 310. Guide rods, four in number, two of which, 311 and 312, appear in Fig. 11 of the drawings, are mounted so as to extend between a shelf or platform 314 rigidly secured to the structure of the cabinet 300 and the top 316 of the cabinet.

The vertical position of the target area of the tube 301 with respect to the window 303 is alterable at will in accordance with the invention by a threaded rod 321 which is secured to the bottom of the platform 308. An internally threaded nut 323 within which the rod 321 is threadedly engaged has formed thereon or secured thereto a worm wheel 324. The worm wheel 324 is rotated by a worm 326, carried on the shaft 328 connected to a motor 331. The motor is carried by the platform 314. A slip clutch drive unit 333 is preferably interposed between the worm 326 and the motor 331 so that when the movable platform 308 comes in contact with stop members 334 and 336 provided on the rods 311 and 312, will cause slippage of the clutch unit 333 and thereby prevent damage to the equipment. A mask movable with the tube may be employed so that the image presented by the tube will become observable at selected areas of the window to the exclusion of other areas. A suitable type of mask has been illustrated in connection with Fig. 1 of the drawings and may comprise two curtains movable with the platform 314 and spaced apart to expose the face of the tube.

A reversing switch or a reversing push button control may be used to control the motor with the reversing switch or push buttons located externally of the cabinet 300. The control switch or control buttons may be a separate unit connected to the cabinet by a cable so that control of the operation of the tube support may be had without approaching the cabinet.

Having now described the invention, what is claimed and desired to be secured by Letters Patent is the following:

1. A viewing structure for image exhibiting apparatus comprising a housing for said apparatus, an image producing device within said housing, a spherical support for said image producing device, the structure of said cabinet comprising spherical transparent means, said spherical support being mounted for universal movement within said transparent means, and said support for said image producing device having an aperture at the location of said image producing device.

2. A viewing structure for television image exhibiting apparatus comprising a cabinet for said apparatus, an image producing cathode ray tube within said cabinet, an opaque spherical support for said image producing tube, said support having a transparent portion substantially coextensive in area with the luminous image to be produced by said tube, a transparent spherical member secured to and exposed exteriorly of the cabinet, said spherical support being nested within said transparent spherical member, and means to provide for concentric movement of said opaque spherical support for the image producing tube with respect to said transparent member.

3. A viewing structure for television image exhibiting apparatus comprising a cabinet for said apparatus, an image producing cathode ray tube within said cabinet, an opaque spherical support for said image producing tube, said support having a transparent portion substantially coextensive in area with the luminous image to be produced by said tube, a transparent spherical member secured to and exposed exteriorly of the cabinet, said spherical support being nested within said transparent spherical member, means to provide for concentric movement of said opaque spherical support for the image producing tube with respect to said transparent member, and means exteriorly of said cabinet for producing said concentric relative movement about a plurality of axes.

JOHN WILLIAM FRITSCH.

REFERENCES CITED

The following references are of record in the file of this patent:

UNITED STATES PATENTS

| Number | Name | Date |
|---|---|---|
| 486,236 | Pierling | Nov. 15, 1892 |
| 1,401,189 | Reiche | Dec. 27, 1921 |
| 1,870,702 | Zworykin | Aug. 9, 1932 |
| 2,068,410 | Hanke et al. | Jan. 19, 1937 |
| 2,207,510 | Flaherty et al. | July 9, 1940 |
| 2,236,578 | Parker | Apr. 1, 1941 |
| 2,259,393 | Roosenstein et al. | Oct. 14, 1941 |
| 2,260,721 | Linsell | Oct. 28, 1941 |
| 2,273,801 | Landis | Feb. 17, 1942 |
| 2,285,768 | Drucker | June 9, 1942 |
| 2,291,931 | Troeger | Aug. 4, 1942 |
| 2,342,874 | Links et al. | Feb. 29, 1944 |
| 2,370,587 | Shapiro et al. | Feb. 27, 1945 |
| 2,413,922 | Jensen et al. | Jan. 7, 1947 |

FOREIGN PATENTS

| Number | Country | Date |
|---|---|---|
| 322,507 | Germany | Oct. 9, 1919 |
| 828,051 | France | May 10, 1938 |
| 836,158 | France | Jan. 12, 1939 |